United States Patent Office 3,285,752
Patented Nov. 15, 1966

3,285,752
METHOD OF PREPARING A POULTRY PRODUCT
Leo J. Hansen, Clarendon Hills, and Donald V. Schwall and Jay T. Colburn, Glen Ellyn, Ill., assignors to Armour and Company, Chicago, Ill., a corporation of Delaware
No Drawing. Filed Mar. 16, 1964, Ser. No. 352,325
7 Claims. (Cl. 99—107)

The present invention relates to a new poultry product having improved characteristics and to the method of preparing same. The new poultry product, produced by the method to be described herein, shows very little water cook-out loss and is made up of individual pieces of poultry meat which adhere together very well and form a cohesive mass with natural tenderness retained and improved.

Usual commercial manufacturing procedures for heat processed poultry meats in cans, logs, or rolls result in considerable losses in water cook-out, which may amount to about 15–30% of the original weight of the poultry meat, varying with the heat treatment employed. Gelatin, wheat gluten, or other materials are sometimes added to the formulation in an effort to hold this water and to hold the meat pieces together. However, the results of such measures leave much to be desired. The poultry meat mass is not continuous and contains gel pockets and layers between the individual meat pieces. The gels not only fail to effectively hold the mass together but are also undesirable from an aesthetic point of view. Moreover, the product usually lacks desired moistness and tenderness.

A primary object of the present invention is to provide a poultry product made up of a plurality of smaller pieces or chunks of poultry meat which are packed together in log, roll, roast, or other form and can be cooked with relatively little cook out of natural juices. A further objocet is to provide a product of the nature just described, which product after cooking is in the form of a solid, cohesive mass which can be sliced into continuous pieces which do not fall apart. A still further object is the provision of a method of economically incorporating poultry skin and smaller scraps in the said product while at the same time improving its tenderness, taste, and general palatability. Other objects of the invention will become apparent as the specification proceeds.

Stated in general terms, the process of the present invention comprises the steps of applying edible metallic salt, such as sodium chloride, to the surfaces of pieces or chunks of poultry meat, agitating or tumbling the said pieces or chunks until a concentration of salt soluble protein is formed on the surfaces thereof, pressing the said pieces together, and then cooking.

The agitation or tumbling of the poultry pieces in the presence of the salt causes salt soluble proteins, such as myosin and actin, to migrate to the surface of each piece and to concentrate there in the form of a creamy, sticky coating. When the pieces are pressed together in a container, this coating has an adhesive effect and binds the pieces together in a cohesive mass. This effect is very much more pronounced after the product has been cooked, and in fact the pressed and cooked product is extremely similar in appearance, texture, and sliceability to a single large unitary piece of poultry meat. A cross-sectional cut through one of these combined pieces reveals, upon close examination, striations or veins representing the protein coating formerly encasing the individual chunks or pieces, but it is significant that these veins are very similar to the main body of meat from the standpoint of color, texture, flexibility, tensile strength, and general appearance, so that they tend to blend into the meat itself and provide the overall appearance and behavior of a unitary piece of meat.

During cooking, the poultry product prepared in the manner just described is found to resist cook-out of natural juices to a very substantial extent, as compared to products prepared in the conventional manner. Thus, poultry meats in cans, rolls, loaves and the like, normally suffer water cook-out losses of about 15% of the original weight of the meat when cooked at 150° F., whereas the poultry product of the present invention loses no more than 5–7% when cooked at the same temperature. The same order of results is obtained at higher cooking temperatures also. For example, at 190° F. the cook-out losses on products prepared in the conventional manner are in the neighborhood of 35–40% but are reduced to 20–25% by the process of the present invention.

The process and product of the invention are dependent upon the ability to extract salt soluble proteins from the poultry meat in order to provide the creamy adhesive coating for binding pieces together, and earlier work on the red meat of animals such as beef, pork, veal and the like had indicated that there were limiting factors on the extraction of salt soluble proteins from meat which would make it impossible for the process to be applied in the regular commercial processing of poultry meat. Thus, in the treatment of red meat it has been found that the amount of salt soluble protein which can be extracted begins to fall immediately after slaughter of the animal, and by the time the animal has passed through rigor mortis the ability to extract salt soluble protein is substantially reduced. Whitaker, Advances in Food Research, IX: p. 32, 1959. Thus, in red meat animals which have passed through rigor mortis, the salt soluble proteins can be extracted in sufficient quantities only if high salt concentrations and vigorous agitation are used. In the case of red meat, the requirement for use of higher salt levels is not a prohibiting factor, since concentrations of 2½ to 3% in red meat are normally acceptable from an organoleptic point of view. On the other hand, poultry meat is basically a more bland food product and salt concentrations higher than about 2 to 2½% are not commercially tolerated in products of this nature. Moreover, in the case of poultry, the onset and resolution of rigor mortis is much more rapid than in red meat animals, and in fact poultry has in most cases passed completely through rigor before the end of the holding period which is required in commercial operations to remove body heat and effect the aging necessary for tenderness in cooking. Since experience with red meat animals had indicated that the salt soluble proteins would be sufficiently extractable from post-rigor mortis meat only at high salt levels not tolerated in poultry meat, and since in the case of commercially processed poultry it would not be possible to begin the extraction until after rigor mortis, it could not have been expected that any acceptable results could be obtained in the case of poultry.

The present invention is based in part on the discovery that passing through rigor mortis has little or no effect on the amount of salt soluble protein which can be extracted from poultry, and particularly from the white meat of poultry. In other words, it has been found that poultry possesses a high level of salt extractable protein immediately following slaughter and that this high level is maintained even after the onset and resolution of rigor mortis. Applying this to the commercial processing of poultry, it has been found that poultry, which has been slaughtered and then aged in the conventional commercial manner to remove body heat and impart tenderness on cooking, is in spite of the aging completely suitable for use in the process of the present invention and does not require the special treatment and conditions which are necessary in the case of post-rigor red meat.

In its preferred embodiment, therefore, the process of the present invention comprises the steps of slaughtering and aging the poultry, applying metallic salt to the surface of pieces of the aged poultry, agitating the pieces until a concentration of salt soluble protein is formed on the surface, pressing the pieces together in a container, and cooking. The term "aging" is used herein in the sense ordinarily employed in the poultry industry, where the aging period is generally referred to as corresponding to the length of time required for poultry to pass through rigor mortis. This time may vary, according to different conditions, but in most cases, the onset of rigor mortis comes within a few minutes after slaughter, reaches its peak at 30 minutes to 2 hours, and is completely resolved within 4 to 12 hours. Aging also corresponds generally to the period of time required after slaughter to remove body heat from poultry immersed in the conventional ice slush tanks utilized in poultry processing plants. The aging period is important in the production of cooked poultry because of the fact that the cooking of poultry which has not been properly aged will result in an undesirable toughness in the cooked product. There are of course a number of devices for speeding up the aging period, and the term "aging" is intended to include not only the conventional aging period but also any of the artificially shortened periods which are effective in providing the desired tenderizing results.

This invention is applicable generally to any type of poultry which is regularly slaughtered, processed and sold for its meat. The term poultry includes turkeys, such as toms, hens, breeders, broilers, fryers, and roasting turkeys; chickens, such as hens, roasters, broilers, fryers, and roasting chickens; ducks; geese; and the like. The invention applies to the white or dark meat of poultry, as well as mixtures thereof, and it applies to poultry of any age, although the younger ages are preferred.

In preparing the poultry for use in the process, certain precautions must be observed. It is preferred that slush ice chilled poultry, brought down to a temperature below 40° F., be used. If instead it is desired to use poultry which has been frozen immediately following slaughter, it is preferred that the frozen bird be thawed in refrigerated air not exceeding 40° F., or in running water not exceeding 50° F., before using as raw material in the process. In either case, the prepared bird is boned in the normal manner, at temperatures preferably below 50° F., and the boned raw pieces and chunks used as starting material in the process. The white and dark meat may be collected separately and used in the process separately if an all-white or all-dark end product is desired, or they may be combined in suitable proportions if a combination end product is desired. The smaller scraps and trimmings and the skin are preferred to be collected separately and used in the process in the manner specifically described hereinafter.

The salt to be applied to the surfaces of the poultry meat pieces or chunks may be any edible metallic salt which can form, with the natural moisture in the meat, a solution capable of extracting salt soluble proteins from the meat to provide a surface coating thereof. Sodium chloride, potassium chloride, and various phosphates may be mentioned as examples. Sodium chloride is preferred because it does not impart undesirable flavors unless used in excessive quantities.

In its preferred embodiment, the process of the present invention involves the use of salt concentrations no greater than 2 or 2½% on post-rigor mortis poultry meat, to provide highly effective results which would not have been expected in view of previous experience on red meat, where substantially higher salt levels are required on post-rigord meat. Below the upper limit of 2 or 2½%, based on the weight of meat, the salt concentrations as low as 0.1% have been found effective under certain conditions. For organoleptic reasons, the upper limit may be somewhat lower in the case of the phosphates or potassium chloride. The preferred salt concentration range is between 1 and 2%, with 1.2–1.5 being optimum.

After salt has been applied to the surfaces of the poultry pieces or chunks, the mixture is agitated or tumbled until a concentration of salt soluble protein is formed at the surface of each piece. Any type of mixing, tumbling, or working action which manipulates or rubs the salt onto or into the raw poultry meat surface is suitable. For example, the salted poultry meat may be suitably agitated in a meat mixer of known type, although other obvious means of agitation such as churns, pumps, and the like may also be employed.

The temperature during the mixing step is preferably held below about 35° F. Temperatures as high as 70° F. have been shown to give some effect, but by far the most efficient extraction of salt soluble protein takes place at temperatures between about 25 and 35° F. Optimum temperatures are 28–30° F. The mixing is continued until such piece or chunk has become soft and pliable and is covered with a creamy coating of extracted salt soluble protein. The mixing time can be as low as 5 minutes but is usually in the neighborhood of 15 to 20 minutes, with dark meat requiring a somewhat longer time than white meat. Agitating the meat under a vacuum or under reduced air pressure has been found beneficial in eliminating "air holes" from the final product. During the mixing step, other additives, such as sugar and spices in low concentrations, may be included without impairing the process.

After completion of the mixing procedure the poultry meat may be pressed together in containers such as casings or cans to provide the conventional forms of processed poultry meat such as rolls, logs, roasts, and the like. For example, the meat from the mixing step may be placed in the mold of a conventional type sausage stuffing machine and stuffed into regular casings under pressure; or it may be pressed into cans or into cooking forms or other type pans for further processing. In any case it is desirable that pressure of some kind be applied to press the pieces of meat together and allow the adhesive nature of the salt soluble protein coating to work for the formation of a cohesive mass.

The packed product is then cooked according to conventional practices, or it may be shipped or stored in raw form for cooking at a later time. It is not necessary for the purposes of the present specification to describe in detail the conditions and techniques for the cooking step, since these are merely the usual practices of the industry. Generally speaking, and taking turkey rolls as an example, the product is cooked in cooking tanks to a final temperature in the range of 160–180° F. over a period of time amounting to about 30 minutes per pound of product.

The cooking step is effective in enhancing the binding properties of the salt soluble protein and in blending the leaves or veins of protein into the meat pieces themselves so that the end product has the appearance and behavior of a unitary cohesive mass with the interleaved veins of protein barely discernible. Although the veins or striations caused by the salt soluble protein are very similar in color, strength, and behavior to the main body of meat, and appear to blend thereinto, their presence nevertheless has a very significant effect, and the resulting cooked product is more juicy and tender.

In a further embodiment of the invention, it has been found that an improved product can be made of separately mixing poultry trimmings, scraps, skin, and salt to form a paste or comminuted batter, and then adding this paste or batter to the salted raw poultry pieces or chunks while the latter are being agitated in the mixer in the main part of the process. It has been found that the skin provides enhanced flavor and aroma to the end product and does not impair the operability of the process. In fact, the paste or batter made from salted skin, trimmings, and scrap is found to improve the cohesiveness of the end product and to enhance not only its flavor but but also its appearance and sliceability. In forming the paste or batter, it is preferred to observe the same conditions with respect to salt concentration, temperatures, and the like, as are used in preparing the mixture of salted poultry pieces in the main part of the process. That is, it is preferred to add salt in concentrations within the range from 1.2–1.5% and to work at temperatures starting at 25–35° F. and not exceeding 70–75° F. It is important that the paste or batter not be added into the main process until after the raw poultry pieces or chunks have been salted and mixed for a period of time. Otherwise, the batter forms a coating on each piece or chunk of meat and inhibits or prevents the salt from coming in contact with the meat surfaces and therefore substantially reduces the protein extraction effect. It is preferred to agitate the salted raw poultry pieces or chunks for a period of at least 4 or 5 minutes before adding the batter.

In a still further embodiment, it has been found possible, without impairment of the end product, to include a substantial portion of cooked poultry pieces or chunks used as starting material for the process. This means that the boning procedure can be carried out more or less on a rough basis and that bones resulting from the rough boning step can be cooked to loosen and remove the remaining pieces of meat. These cooked pieces can then be added to the raw pieces and used in the process of the present invention without impairment of its efficacy. Salting and agitating of the cooked pieces does not result in extraction of proteins to any substantial degree, but the extraction of protein from the raw pieces has been found sufficient to coat both types of meat, as long as the amount of cooked meat does not exceed the amount of raw meat in the mixture.

Specific examples illustrative of the invention are set out as follows:

EXAMPLE I

Turkeys were slaughtered, dressed, and slush ice chilled to a temperature of 35° F. The chilled turkeys were then boned, keeping the temperature of the meat below 50° F. during the entire procedure. In the boning operation, the breast meat was carefully removed by hand-boning and kept in a separate container. Dark meat was removed from the thigh portion of the leg only and was also kept in a separate container.

500 lbs. of white meat obtained in the manner just described were placed in thin layers on clean trays and chilled in a freezer for approximately 1 hour, thus bringing the temperature of the meat down to 28–30° F. The 500 lbs. of white meat was then placed in an Anco Vacuum Mixer, which was prechilled with ice, and 11.5 lbs. of a salt and spice mixture containing 7.5 lbs. of sodium chloride was sprinkled evenly over the surface of the meat. The mixer was operated for a period of 15 minutes, during which time the white meat became soft and pliable and covered with a creamy sticky coating.

The meat was then taken from the mixer and placed in the mold of a sausage stuffing machine, and stuffed into Visking No. 8 M P casings, clipped at each end with metal clips, resulting in turkey white meat rolls weighing approximately 9 lbs. each.

The rolls were placed in cooking tanks in a vertical position and cooked for 5½ hours to a final internal meat temperature of 166° F., and this rose to 170° F. before the subsequent cooling step began to take effect.

Upon completion of the cooking step, the water temperature in the cooking tank was rapidly cooled to 50° F. and the rolls kept in this water for 1 hour, followed by 4 hours in air-agitated slush ice water, as a result of which the temperature of the rolls was brought below 40° F. The rolls were then frozen to 0° F., packed into individual boxes, and stored for shipment or for further packaging and labeling.

EXAMPLE II

Turkeys which had been slaughtered, dressed, and quick-frozen, were thawed in running water of 50° F. and then brought down to a temperature of 40° F. with ice. The turkeys at this temperature were boned, to remove and collect the white and dark meat separately.

500 lbs. of dark meat obtained in this manner was reduced to 28–30° F. by placing on trays in thin layers in a freezer for 1½ hours. The chilled dark meat was placed in an Anco Vacuum Mixer which had been prechilled with ice, and 2.3% of a salt and spice mixture containing 66% sodium chloride was sprinkled evenly over the surface of the meat. The mixer was operated for a period of 20 minues, during which time the dark meat became soft and pliable and covered with a creamy sticky coating.

The meat was then taken from the mixer and stuffed into casings, cooked, cooled, and stored as in Example I.

EXAMPLE III

Raw material preparation

Turkeys were slaughtered, dressed, slush ice chilled to a temperature of 35° F., and boned. In the boning operation, the breast meat was carefully removed by hand-boning, care being taken to remove all skin, excess fat, bruises, dark spots, blood clots, pin feathers, gristle, and tendons, and the skin being placed in a separate container. Dark meat was removed carefully from the thigh portion of the leg only, observing the same precautions as in the case of the breast meat. "Wing knobs" were removed and placed in a separate container.

Raw meat chilling 500 lbs. of boned white meat were placed in thin layers on clean trays in a freezer for about 1 hour to bring the temperature down to 28–30° F.

Batter precautions 41 lbs. of skin, 20 lbs. of wing knobs and 21 lbs. of boneless scrap white meat were placed in a prechilled silent cutter, along with 1.9 lbs. of a salt and spice mixture containing 1.2 lbs. of sodium chloride, and the mixture was chopped for 5 minutes. The chopped batter was chilled rapidly to 35° F.

Mixing

The 500 lbs. of white meat were placed in Anco Vacuum Mixer which had been prechilled with ice, and 11.5 lbs. of a salt and spice mixture containing 7.5 lbs. of sodium chloride was sprinkled evenly over the surface of the meat. The mixer was operated for 5 minutes, and then the 85 lbs. of batter was added and the mixing continued for an additional 15 minutes. During the mixing operation, a vacuum of 22 in. was maintained in order to prevent air holes in the end product.

The mixture was then taken from the mixer and stuffed into casings, cooked, cooled, and stored as in Example I.

EXAMPLE IV

Broiler chickens were slaughtered, dressed, and slush ice chilled to a temperature of 35° F. according to conventional poultry processing procedures. The chilled broilers were then boned to collect dark and white meat in pieces and chunks.

300 lbs. of boned, raw white meat thus obtained and 200 lbs. of boned, raw dark meat were spread in thin layers on clean trays in a freezer for approximately 1 hour to bring the temperature down to 28–30° F., and the chilled meat was then placed in a prechilled Anco Vacuum Mixer and covered evenly with 4 lbs. of edible grade sodium tripolyphosphate. The mixture was agitated for a period of 20 minutes, at the end of which time the pieces of chicken had become soft and pliable and covered with a layer of creamy, sticky material.

The treated mixture of white and dark poultry meat was then stuffed into perforated casings and roasted in an oven at about 170° F. for a period of time corresponding to 25 minutes for each pound of product weight. The chicken roasts produced in this manner resulted in product yields of 89–92%, as compared to yields of 75–80% in chicken roasts prepared in the same manner but omitting the agitation step in the presence of phosphate salt.

EXAMPLE V

Pieces of turkey meat were obtained from carcasses as described in Example II.

500 lbs. of white meat were mixed for 15 minutes with 2% of a salt spice mixture containing 66% sodium chloride. A like portion of dark meat was mixed in the same manner for 20 minutes.

The mixed raw meat was placed in aluminum pans, with a piece of skin on top of each portion, and the product was frozen and stored. At a later time, the product was roasted from the frozen state. The meat maintained the shape of a single body of roast turkey.

While in the foregoing specification this invention has been described in relation to preferred embodiments thereof, and many details have been set forth for the purpose of illustration, it will be apparent to those skilled in the art that the invention is susceptible to other embodiments and that many of the details set forth herein can be varied considerably without departing from the basic principles of the invention.

What is claimed is:

1. A method of preparing a poultry product comprising the steps of slaughtering and aging poultry, applying to the surface of raw pieces of said aged poultry edible metallic salt which can form, with the natural moisture in the poultry meat, a solution capable of extracting salt soluble proteins from said meat to provide a surface coating thereof, said edible metallic salt being applied in a concentration within the range of .1 and 2.0% based on the weight of said poultry pieces, agitating said pieces at a temperature within the range of 25 to 70° F. until a concentration of salt soluble protein is formed on the surface thereof, and pressing said pieces together to form a unitary body characterized by its improved resistance to water cook-out and its retention of intact sliceability after cooking.

2. The method of claim 1 wherein said edible metallic salt is sodium chloride.

3. The method of claim 1 wherein the temperature of said pieces of meat is held within the range of 25 to 35° F. during agitation.

4. The method of claim 1 wherein the concentration of salt is within the range of 1 and 2% based on the weight of said poultry pieces.

5. The process of claim 1 wherein said agitation is carried out under reduced air pressure.

6. The method of claim 1 wherein said edible metallic salt is an edible metallic phosphate salt.

7. The method of claim 6 wherein said phosphate salt is sodium tripolyphosphate.

References Cited by the Examiner

UNITED STATES PATENTS

| | | | |
|---|---|---|---|
| 1,503,864 | 8/1924 | Vogt | 99—108 |
| 2,808,335 | 10/1957 | Pierce | 99—107 |
| 2,822,276 | 2/1958 | Blair et al. | 99—187 |
| 2,874,060 | 2/1959 | Turner et al. | 99—107 X |
| 3,024,113 | 3/1962 | Torr | 99—107 |
| 3,076,713 | 2/1963 | Maas | 99—107 |
| 3,173,795 | 3/1965 | Torr | 99—107 X |

OTHER REFERENCES

Jacobs, "The Chemistry and Technology of Food and Food Products," vol. II, 1951, published by Interscience Publishers, Inc., New York, pp. 906 and 907, article entitled Rigor Mortis.

Meyer, "Food Chemistry," 1960, published by Reinhold Publishing Corporation, New York, pp. 181 to 186, inclusive.

A. LOUIS MONACELL, *Primary Examiner.*

HYMAN LORD, *Examiner.*